United States Patent [19]

Amitrano et al.

[11] Patent Number: 5,582,093

[45] Date of Patent: Dec. 10, 1996

[54] FRYING APPARATUS FILTER SYSTEM

[75] Inventors: Roy A. Amitrano, Nashua; William F. Kotowski; David P. Masciarelli, both of Manchester; Louie C. Moon, Pittsfield, all of N.H.

[73] Assignee: G. S. Blodgett Corporation, Burlington, Vt.

[21] Appl. No.: 626,319

[22] Filed: Apr. 2, 1996

[51] Int. Cl.⁶ .................................................... A47J 37/12
[52] U.S. Cl. .................. 99/408; 99/330; 99/403; 210/167; 210/DIG. 8
[58] Field of Search .............................. 99/330, 403, 408, 99/418, 404–407, 409–417; 126/391; 134/167 R, 115 R, 169 R, 170, 111; 210/167, 232, 234, 316, 482, 416.5, 117, DIG. 8; 426/417, 438

[56] References Cited

U.S. PATENT DOCUMENTS

| | | | |
|---|---|---|---|
| 3,667,374 | 6/1972 | Holmes | 99/408 |
| 3,716,140 | 2/1973 | Keating | 210/167 |
| 3,797,378 | 3/1974 | Morris | 210/DIG. 8 |
| 4,195,667 | 4/1980 | Moore et al. | 99/408 |
| 4,210,123 | 7/1980 | Moore et al. | 99/330 X |
| 4,324,173 | 4/1982 | Moore et al. | 99/408 X |
| 4,420,006 | 12/1983 | Moore et al. | 134/167 R |
| 4,702,827 | 10/1987 | Wenzel | 210/117 |
| 4,890,548 | 1/1990 | Grob et al. | |
| 4,899,649 | 2/1990 | Grob et al. | |
| 4,974,501 | 12/1990 | Grob et al. | 99/330 X |
| 5,228,985 | 7/1993 | Wells et al. | 210/167 |
| 5,247,876 | 9/1993 | Wilson et al. | 99/403 X |
| 5,404,799 | 4/1995 | Bivens | 99/408 |
| 5,486,370 | 1/1996 | Bivens | 426/417 |

*Primary Examiner*—Timothy F. Simone
*Attorney, Agent, or Firm*—Donald C. Casey

[57] ABSTRACT

A self contained filter assembly is provided for a deep fat fryer which permits repeated filtering and reusing of the oil as a cooking media in the fryer. The filter includes a pan received in a drawer beneath the housing of the fryer which provides a filter media along the upper surface of a grid therein. Suction is applied by a suction pump mounted within the fryer which communicates between the surface of the filter pan below the grid and the fry pot itself. When the outlet valve on the fry pot is opened the oil flows downwardly by gravity into the filter pan and the pump applies suction to the surface of the pan to draw the oil through a filter media and return the filtered oil to the fry pot.

17 Claims, 4 Drawing Sheets

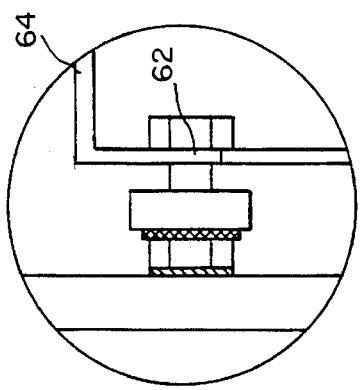
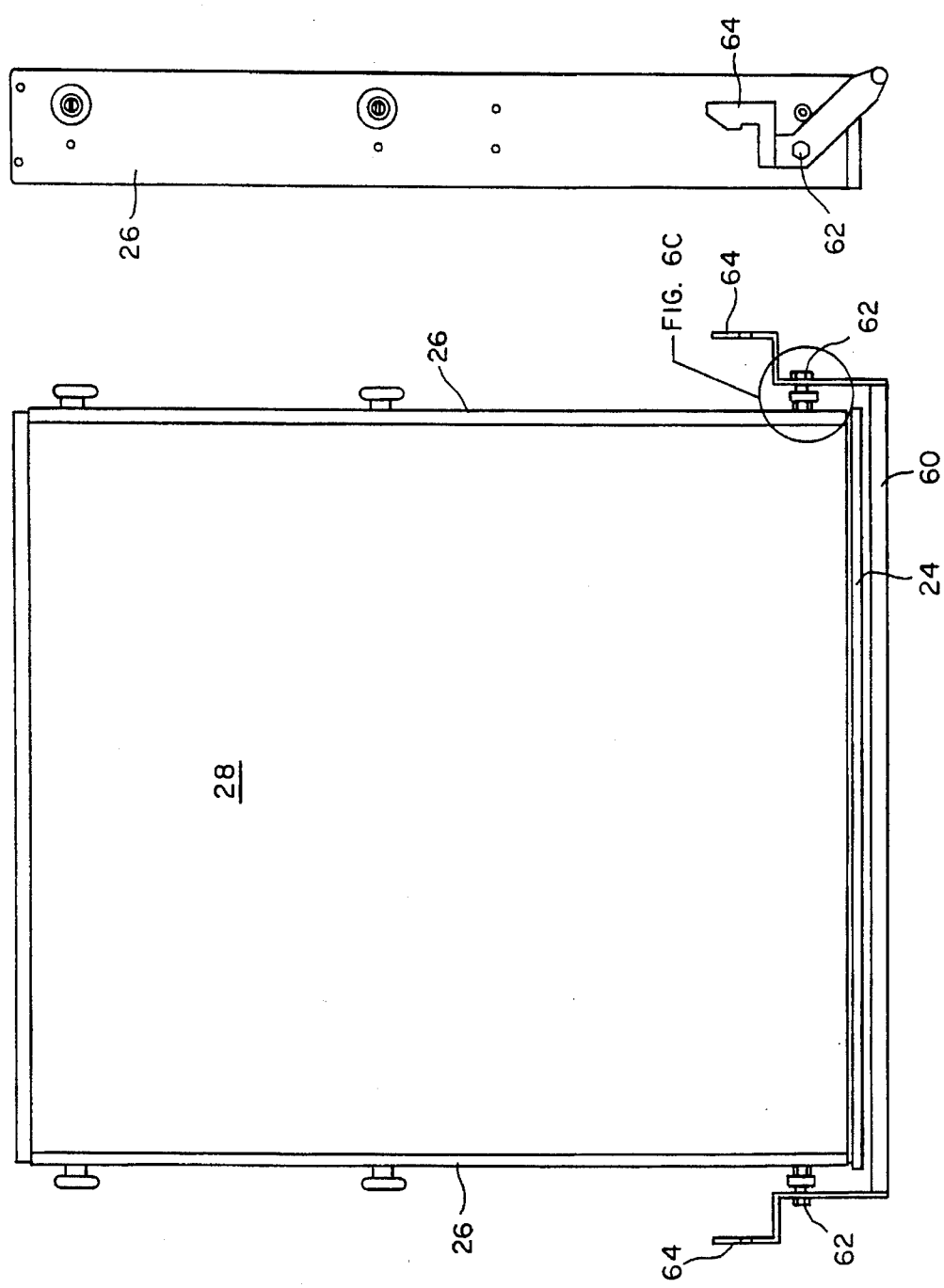
Fig. 6C
Fig. 6B
Fig. 6A

FRYING APPARATUS FILTER SYSTEM

CROSS REFERENCE TO RELATED APPLICATIONS

This application is related to co-pending application entitled GAS FIRED DEEP FAT FRYER filed on even date herewith and assigned to the Assignee of this invention. Accordingly the disclosure of that application is hereby incorporated by reference.

DESCRIPTION OF THE PRIOR ART

The prior art contains a number of deep fat frying systems which are used in commercial restaurants including fast food restaurants to fry a variety of different foods such as potatoes, chicken, fish and the like. Typically in the case of meats, the food is frozen and batter coated. The frozen food is immersed in hot cooking oil in a mesh cooking container which allows the turbulent oil to flow around the food to be cooked. Due to the turbulence thereof, often times pieces of batter and food are dislodged, and enter the oil bath.

In many commercial deep fat fryers the upper section thereof is used for cooking and a source of heat is provided below this section. Further below the source of heat is a relatively colder section wherein loose food particles dislodged from the cooking container or basket settle.

When cooking foods such as fish, for example, it is desirable to use a very hot oil bath, and to shorten the cooking time so that the food cooks as rapidly as possible at an elevated temperature. The purpose is to cook the food without adding undesirable tastes thereto. Undesirable tastes can come from, for example, prolonged exposure to oil or from the use of cooking oil which has been contaminated with cooked food particles.

In other words, during repeated use of the same oil in a fry pot, the accumulation of dislodged food particles which continue to cook can impart an undesirable strong, or burnt taste to the food cooked therein. The solution, of course, is to filter the oil on a frequent basis. From an economic stand point then, the cooking oil should be filtered on a frequent basis until it has exceeded its useful life and then discarded. Proper filtering then should extend the life of the oil without undesirable tastes accumulating therein.

In a commercial operation it is desirable to quickly and efficiently filter the oil so that cooking operations can be resumed without a prolonged shut down of the fry pot. When it is necessary to filter the oil, the heat is turned off, and typically a valve in the bottom of the tank is opened whereby the oil flows from an outlet in the bottom of the tank into a container.

In, for example, U.S. Pat. Nos. 4,890,548 and 4,899,649 there is described a self supporting filter tank assembly on wheels which contains the tank, filter apparatus and pump for returning the filtered oil to the fryer. In this situation, the filter system is rolled up to the tank outlet, and the outlet opened so that oil therein flows into the tank and into a sump therein. The oil passing into the sump is filtered and then, a pump mounted on the wheeled assembly is actuated to return the filtered oil from the sump to the fry pot. As described therein, if the oil has exceeded its useful life, it is retained in the sump while the wheeled container is removed for emptying into a dump. It is described therein that these filter systems have the advantage of not occupying floor space in that they can be stored under the fry pot. In other prior art devices, the filter and tank were provided on separate wheeled vehicles that could not be stored under the fry pot, or they were built into the fryer apparatus, itself, occupying much needed floor space with permanent construction.

It has been discovered, however, that a novel filter system can be provided which is built into the fryer for extra stability but which rapidly and efficiently can be used to filter oil from a fry pot or from a plurality thereof.

SUMMARY OF THE INVENTION

The filter system according to this invention is equally applicable to a fry pot whether it is gas fired or electrically heated, or to a plurality thereof wherein the tank outlets are in communication with a common manifold.

The filter of this invention is intended to be mounted in a drawer which typically is provided on the under side of a fryer below the access door thereto. In this situation then the tank outlet can be opened and the oil will flow by gravity into a sump. A pump provided in the fryer housing itself then is used to apply suction for drawing the filtered oil from the sump and for returning the same quickly and efficiently to the tank.

The drawer itself is provided with a sloped rear portion and a sump like front portion wherein the filter is housed. The filter may be filter paper, or the like which is placed over a grid of unique design and held in place by a rack. Suction from the pump is applied within the grid to draw the oil through the filter paper. The filter paper then can be removed merely by removing the rack and lifting the same from the drawer.

If it is desired to dispose of the oil rather than filter it, the fryer outlet can be opened and a separate container provided for disposal. The device of this invention is intended for rapidly and efficiently filtering the oil and returning the same to the tank for reuse. By limiting the device of this invention to the specific function of filtering and returning the oil, a rapid and efficient means therefore can be provided so that the down time associated with filtering is minimized and the useful life of the oil can be extended by promptly filtering the same before undesirable tastes accumulate from cooked food particles remaining in the oil bath.

Accordingly it is an object of this invention to provide a filter system for a deep fat fryer which is self contained in a drawer received in the lower portion of the fryer housing.

It is another object of this invention to provide a filter system for a deep fat fryer wherein the filter itself is contained in a drawer in the housing so that is can be rapidly and efficiently replaced, but the pump therefore for circulating the oil is mounted within the housing rather than on the filter assembly itself.

It is still another object of this invention to provide a drawer mounted filter assembly which is received in the lower portion of the housing for a deep fat fryer disposed below the tank outlet wherein the outlet is opened, the oil in the tank will flow by gravity into a sump within the drawer and will be filter by suction applied within the sump through a suction pump which returns the filtered oil to the cooking tank.

It is a further object of this invention to provide a filter apparatus for a deep fat fryer system which can be utilized from a single drawer mounted in the lower portion of one of said deep fat fryer housings, but which can accommodate and filter the oil from a plurality of adjacent such units through a common manifold.

BRIEF DESCRIPTION OF THE DRAWINGS

FIG. 6a is a top view of the drawer mounted filter assembly of this invention;

FIG. 6b is a side view of FIG. 6a;

FIG. 6c is a detailed view of detail 6c of FIG. 6a;

DESCRIPTION OF THE PREFERRED EMBODIMENT

Figures 1, 2:
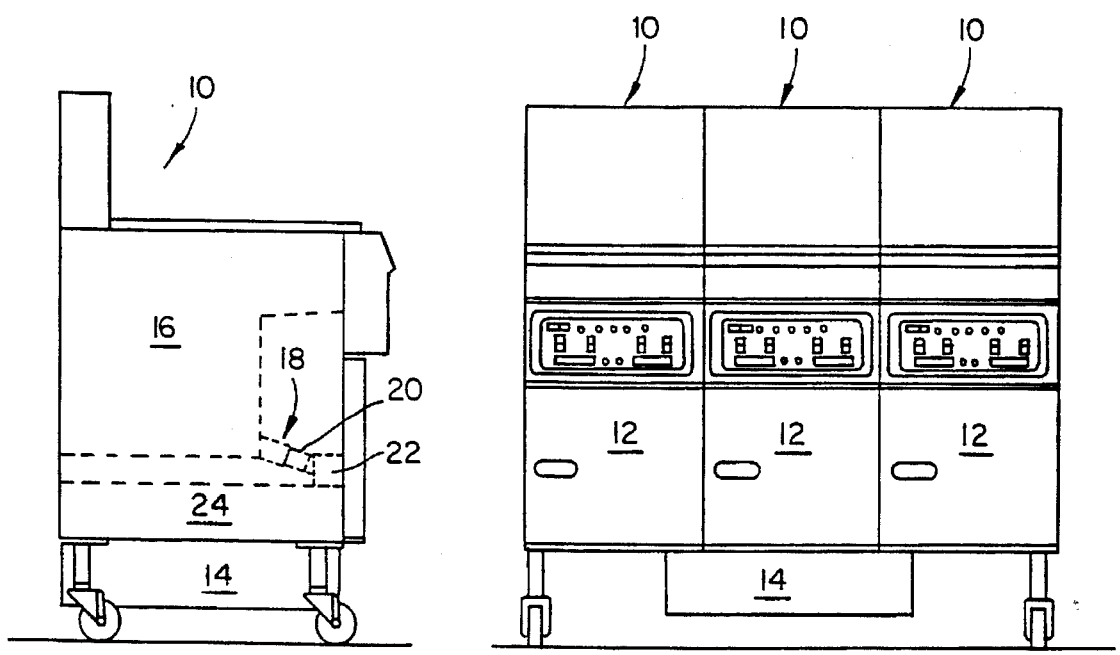
FIG. 1 is a front view of a typical deep fat fryer assembly utilizing the filter system of this invention.
FIG. 2 is a side view of the assembly of FIG. 1 showing the fry pot, drain and filter drawer schematically, in the phantom.

With attention to the drawings, FIG. 1 is a front view of a bank of deep fat fryers 10. Each has an access door 12, and the filter pan 14 is pictured disposed below the fryers 10.

With attention to FIG. 2, the fryer contains a fry pot 16 of conventional design, or designed according to the description in the above identified related patent application. In any event, typically the fry pot 16 has a drain conduit 18 which extends therefrom for draining oil. A valve 20 may be provided on the outlet 18.

The depiction in phantom on FIG. 2 is intended to be a schematic representation of a typical fry pot with drain outlet. This invention relates to a filter system used in order to filter the oil for reuse in the fry pot. While the fry pot depicted could be conventional, it could also be a fry pot of the design described in the above identified related application. The fry pot design then is not intended to be limitative of the invention but rather illustrative as shown in FIG. 2.

The drain 18 then (when valve 20 is open) empties through a splash plate 22 into a filter assembly, as will be subsequently described, contained within a drawer 24. Drawer 24 is slidably received within the deep fat fryer 10 behind the access door 12.

Figure 3:
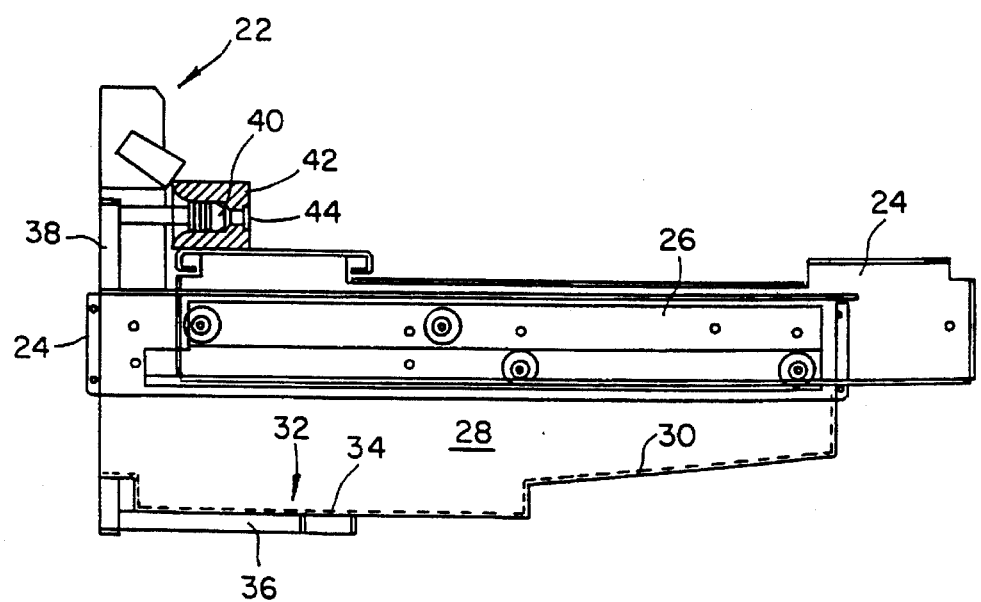
FIG. 3 is a cross-sectional view of the drawer mounted filter assembly of this invention.

FIG. 3 shows one embodiment of the filter assembly of this invention. In the embodiment of FIG. 3 the drawer 24 includes a slide assembly 26 which is conventional and is provided on either side thereof whereby wheels fit in tracks (not shown) in the internal sides of the deep fat fryer 10. A filter pan 28 is mounted within the drawer 24 to receive oil from outlet 18. The drawer 28 includes a sloping bottom 30 which empties into a filter portion 32 which houses a filter, and provides an outlet hole 34. Hole 34 then communicates through a conduit 36 with a hollow upright conduit 38 to a male coupling member 40. When the drawer 24 is opened to withdraw it from the interior of the deep fat fryer 10 along slide assembly 26, the male member 40 disengages from female coupling block 42 which remains affixed within the interior of deep fat fryer 10 as will be subsequently explained. Block 42 then communicates through an outlet 44 with a suction pump (not shown) which in turn communicates with the fry pot 16 so that when oil enters the filter drawer 28 it collects in the lower portion 32 thereof and is drawn through the outlet 34 by suction applied to the male member 40 by the remote suction pump through the block 42. In this way when oil from the tank through outlet 18 strikes the splash plate assembly 22 it is directed downwardly into the filter drawer 28 whereupon it is drawn back through the conduits 36 and 38 and the male member 40 to be returned by the suction pump (not shown) to the tank 16 for reuse.

Figure 4:
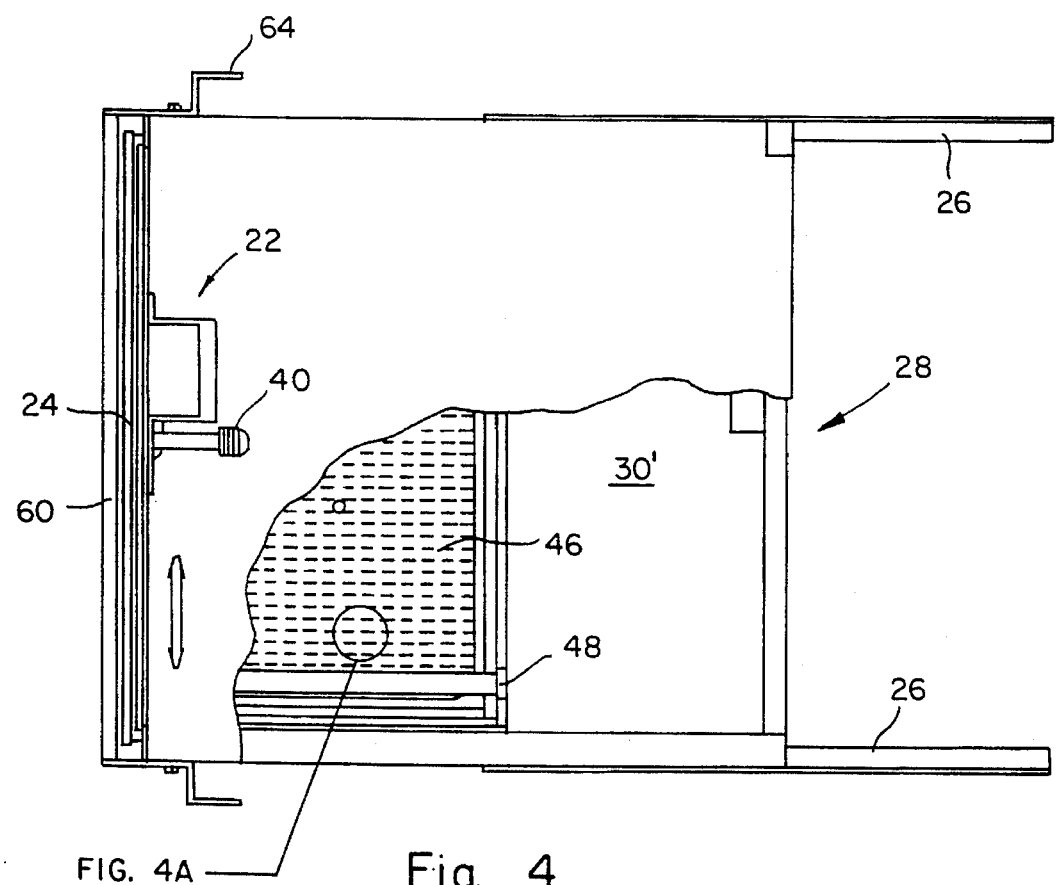
FIG. 4 is a top view of the drawer mounted filter assembly of this invention with a portion of the lid removed.
Figure 4A:
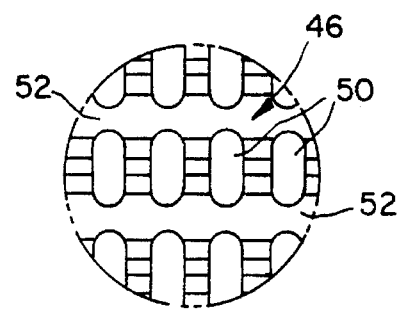
FIG. 4a is a detailed view of FIG. 4a from FIG. 4.

With attention to FIG. 4, the filter pan 28 at its lower surface 32 defines a grid 46 which supports a conventional filter media such as filter paper (not shown). The filter media is held in place against grid 46 by a frame 48 shown on FIG. 5. When suction is applied at the surface of the lower portion 32, the filter media, supported by the raised portions 50 of the grid 46, filters the oil as it seeps downwardly into the channels 52 and from there to a drain such as outlet 34 shown in the embodiment of FIG. 3.

Figure 5:
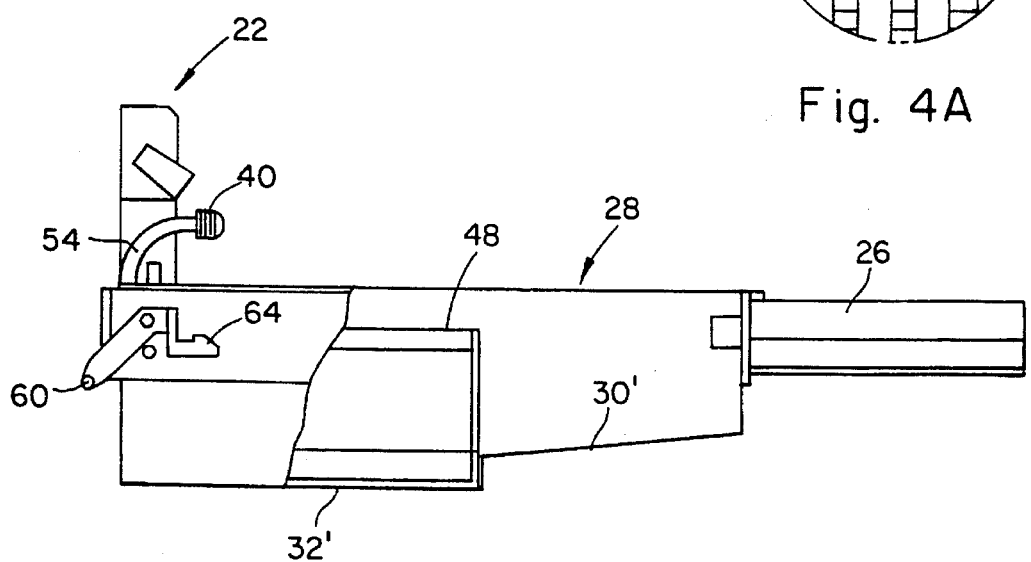
FIG. 5 is a cross-sectional view of an embodiment of the drawer mounted filter assembly of this invention.

FIG. 5 shows another embodiment of the filter pan wherein the coupling male member 40 is supported by an internal conduit 54 which communicates at its base (not shown) with the surface 32' of the filter pan 28. This 5 eliminates external the conduit members 36 and 38 along with the outlet 34 so that suction is applied directly through conduit 54 to the surface 32'. Obviously, the low point of the surface 32' is at the base of conduit 54.

With reference to FIGS. 6A–C, typically the drawer 24 will have an external handle 60 which is rotatable about pivot points 62 on either side thereof and supports a safety hook 64 also on either side thereof. Hooks 64 are intended to engage a corresponding pin member (not shown) in opposite sides of the housing of fryer 10 so that when the handle 60 is raised the hook rotates about pivot point 62 in a clockwise direction as shown in FIGS. 6A–C to disengage so that the drawer can be withdrawn through the open access door 12 for cleaning, removal and replacement of the filter media. In that event, the frame 48 is raised, and the filter media manually removed from the surface of grate 46 and a fresh filter media laid thereover.

Figure 7:
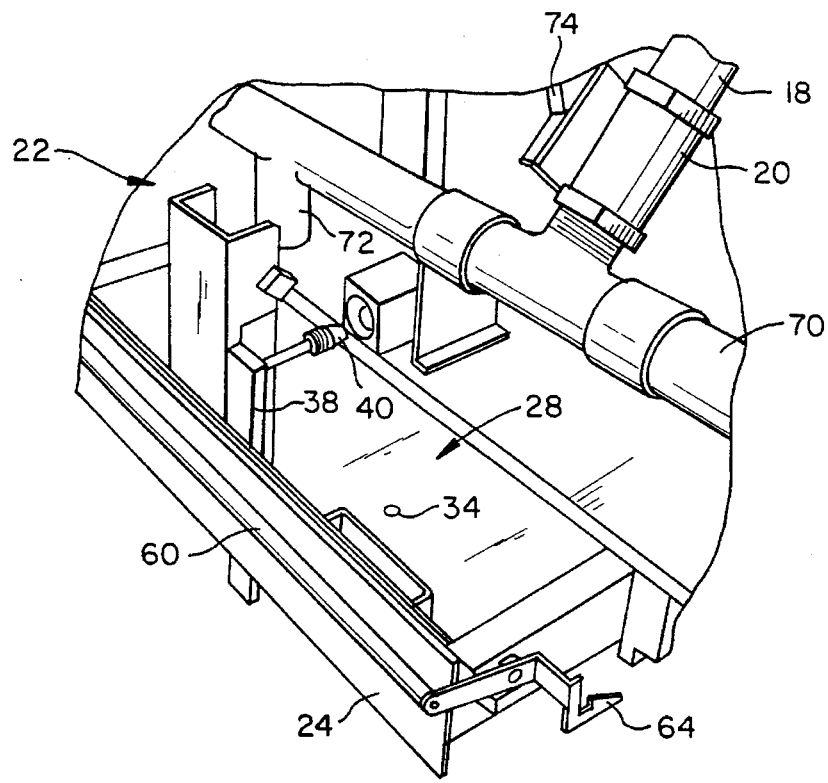
FIG. 7 is a fragmentary perspective view of a portion of the filter assembly of this invention showing the tank outlet and the adjacent filter assembly.

FIG. 7 shows in perspective fragmentary view of the opening of drawer 24 to reveal the interior of the filter pan 28. This is the embodiment of FIG. 3 so that the male vacuum connection member 40 extends from conduit 38 and a drain hole 34 is provided which is in communication with conduit 36 (not shown in this view). As will be obvious to those skilled in the art, the embodiment of FIG. 5 would function the same except that a conduit 54 would be used instead of conduits 36 and 38 and the drain hole would be eliminated.

In this embodiment, the outlet 18 from the tank has an outlet valve 20, but a manifold 70 is provided so that a plurality of deep fat fryers 10 can be linked to the same drawer and oil from each individual outlet 18 will flow through manifold 70 and the outlet 72 therefrom into the splash plate assembly 22 and from there into the filter drawer 28.

Figure 8:
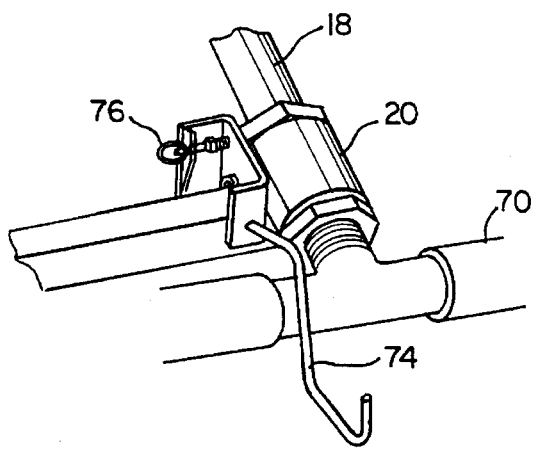
FIG. 8 is a fragmentary perspective view of the mechanism used according to this invention to control the tank outlet.

In the preferred embodiment of this invention a safety catch is applied to the outlet valve 20 from tank 18 so that oil will not be inadvertently be removed from the deep fat fryer. As will be obvious to those skilled in the art, the heat source should be shut off before the oil is drained from the tank. In the safety valve embodiment of FIG. 8, a rotatable handle 74 is provided along with a spring pin 76. FIG. 8 shows the valve in the open position wherein the handle has been rotated toward the manifold 12. Typically, the operator will open the door 12 and grasp the handle 74 which would be in the upright closed position shown in fragment in FIG. 7 and with the left hand grasp the pin 76 and pull it laterally away from the valve coupling 20. When the pin disengages the valve, the handle is rotated into the position shown in FIG. 8 which opens the valve. In this way the operator must use both hands in order to open the valve.

In summary then the filter assembly of this invention is intended to be used with any type of deep fat fryer and is contained within a drawer disposed below the fryer. In order to operate the filter, the access door is opened and the operator manually opens the valve which in turn opens the outlet 18 from the tank 16.

Oil then flows downwardly through the splash plate assembly 22 and collects in the filter pan 28 within the drawer. A pump (not shown) is mounted within the fryer itself and the pump communicates between the surface of the lower portion of the filter pan and the tank so that when the pump is engaged, suction will be applied to the surface of the pan beneath the filter media and the oil will be drawn through the filter, and returned through the pump to the tank.

In order to clean the assembly, the drawer is merely withdrawn by the operator by grasping and rotating the handle thereon. The frame 48 which holds the filter media against the grid 46 is removed and the filter media is removed. A fresh filter media is then placed on the surface of grid 46, the frame 48 replaced to hold it in place, and the drawer closed. When the drawer closes the male member 40 which may have 0 rings (not shown) sealingly engages the block 42 and the unit is ready to be reused.

It will be readily seen by one or ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

We claim:

1. In a deep fat fryer including an upwardly opening fry pot for containing oil and having a drain outlet at the bottom thereof, a source of heat coupled to the fry pot for heating the oil contained therein, a housing therefor having a front, back, sides an open top for access to the fry pot and a bottom; said fryer further including an internal, clean oil delivery system including a pump and a conduit in communication therewith for supplying oil to said fry pot, the improvement comprising:

a self contained filter system comprising a drawer slidably mounted in the fryer housing below the fry pot drain outlet movable between a closed position and an open position relative to said housing;

a filter pan disposed in said drawer having sides and a bottom, said bottom sloping to a low area thereof having therein a lowest point;

a raised grating covering the low area of said bottom said grating adapted to support a filter media extending thereacross above the surface of said low area and;

suction means coupled between the low point of said bottom and oil delivery system, placing said pump in communication with the low point for removing filtered oil passing through said media from the low point of said bottom and circulating said oil to said fry pot.

2. The fryer of claim 1 wherein said drawer has a front, sides and back which correspond to the front, sides and back of said fryer housing.

3. The fryer of claim 2 wherein said filter pan has a front section disposed adjacent the front of said drawer and a back section disposed adjacent the back of said drawer, one of said front or back sections defining said low area and the other defining a surface sloping downwardly thereinto.

4. The fryer of claim 3 wherein the low area is contained in the front section.

5. The fryer of claim 3 wherein the low point is located centrally of the low area.

6. The fryer of claim 4 wherein the low point is located adjacent the front portion of said low area.

7. The fryer of claim 1 wherein said suction means further comprises a releasable coupling means for decoupling said delivery system and the low point of said bottom when said drawer is in the open position and for re-coupling said system to the low point when said drawer is in the closed position.

8. The fryer of claim 7 wherein a conduit is mounted on said drawer having a male coupling at one end and extends between the male coupling member and the low point of said pan for placing the same in communication, and a female coupling block is carried by said housing in registration with the male member whereby when said drawer is in the closed position said male member and female block are coupled and when said drawer is in the open position said member and block are decoupled.

9. The fryer of claim 1 wherein the fry pot drain outlet is disposed over the filter pan for receiving oil from said fry pot.

10. The fryer of claim 1 wherein said drawer includes splash plate means for directing oil draining through the fry pot outlet into the low area of said filter pan.

11. The fryer of claim 1 further comprising manually operable valve means coupled to the fry pot drain outlet for opening to release oil from the fry pot therethrough and for closing to retain oil therein.

12. The fryer of claim 11 wherein said valve means includes a biased, retractable locking pin engaging said valve whereby said pin must be retracted before said valve can be opened.

13. The fryer of claim 12 wherein said valve means further comprises an actuating handle coupled thereto and to said pin whereby when said pin is retracted said handle can be rotated to open said valve.

14. The fryer of claim 2 further comprising actuating handle means carried by said drawer and lock means coupled between said drawer and said housing for controlling movement of said drawer between the open and the closed position relative to said housing.

15. The fryer of claim 14 wherein said handle extends across the front of said drawer.

16. The fryer of claim 15 wherein said lock means includes a pair of hook members rotatably mounted one on each side of said drawer and adapted to engage said housing when said drawer is in the closed position.

17. The fryer of claim 16 wherein said handle extends between said hook members whereby said members rotate into and out of engagement with said housing responsive to movement of said handle.

* * * * *